United States Patent
Harada

(10) Patent No.: US 6,288,789 B1
(45) Date of Patent: *Sep. 11, 2001

(54) PRINTING APPARATUS AND PRINTING METHOD

(75) Inventor: Takuto Harada, Koshigaya (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/782,391

(22) Filed: Jan. 13, 1997

Related U.S. Application Data

(63) Continuation of application No. 08/281,176, filed on Jul. 27, 1994, now abandoned.

(30) Foreign Application Priority Data

Jul. 30, 1993 (JP) ................................... 5-190242

(51) Int. Cl.[7] .................................................. G06F 15/00
(52) U.S. Cl. .......................................... 358/1.15; 358/1.13
(58) Field of Search ..................................... 395/112, 114, 395/110, 167, 763, 778, 789, 117, 102, 115, 116, 840, 842, 101, 800, 800.01, 800.43, 834, 841, 851–853, 872, 113; 346/33 R; 345/467, 471, 520; 707/502, 516, 527, 500, 526, 906, 911, 542; 710/20, 22, 14, 21, 31–33, 52; 712/1, 43; 358/1.1, 401, 407, 468, 501

(56) References Cited

U.S. PATENT DOCUMENTS

| | | | |
|---|---|---|---|
| 4,594,674 | * 6/1986 | Boulia et al. | 395/150 |
| 4,975,859 | * 12/1990 | Takagishi et al. | 395/275 |
| 5,038,298 | 8/1991 | Matsumoto et al. | 395/148 |
| 5,157,773 | 10/1992 | Matsumoto et al. | 395/375 |
| 5,371,873 | * 12/1994 | Niwa | 395/425 |

FOREIGN PATENT DOCUMENTS

| | | |
|---|---|---|
| 4-257917 | 9/1992 | (JP) . |
| 5-58007 | 3/1993 | (JP) . |

* cited by examiner

*Primary Examiner*—Dov Popovici
(74) *Attorney, Agent, or Firm*—Fitzpatrick, Cella, Harper & Scinto

(57) ABSTRACT

A printing apparatus receives print data described by a printer language from a host computer and prints an image of characters and figures on the basis of the print data. The printing apparatus includes a bit map image developing circuit for receiving print data from the host computer through a bidirectional interface and developing the print data into a bit map image, a bit map image transmitter for transmitting the bit map image of one page developed by the bit map image developing circuit to the host computer through the bidirectional interface, an input unit for inputting instruction information to instruct a printing process from the host computer through the bidirectional interface, and a print controller for printing the bit map image on the basis of the instruction information received through the input unit.

41 Claims, 5 Drawing Sheets

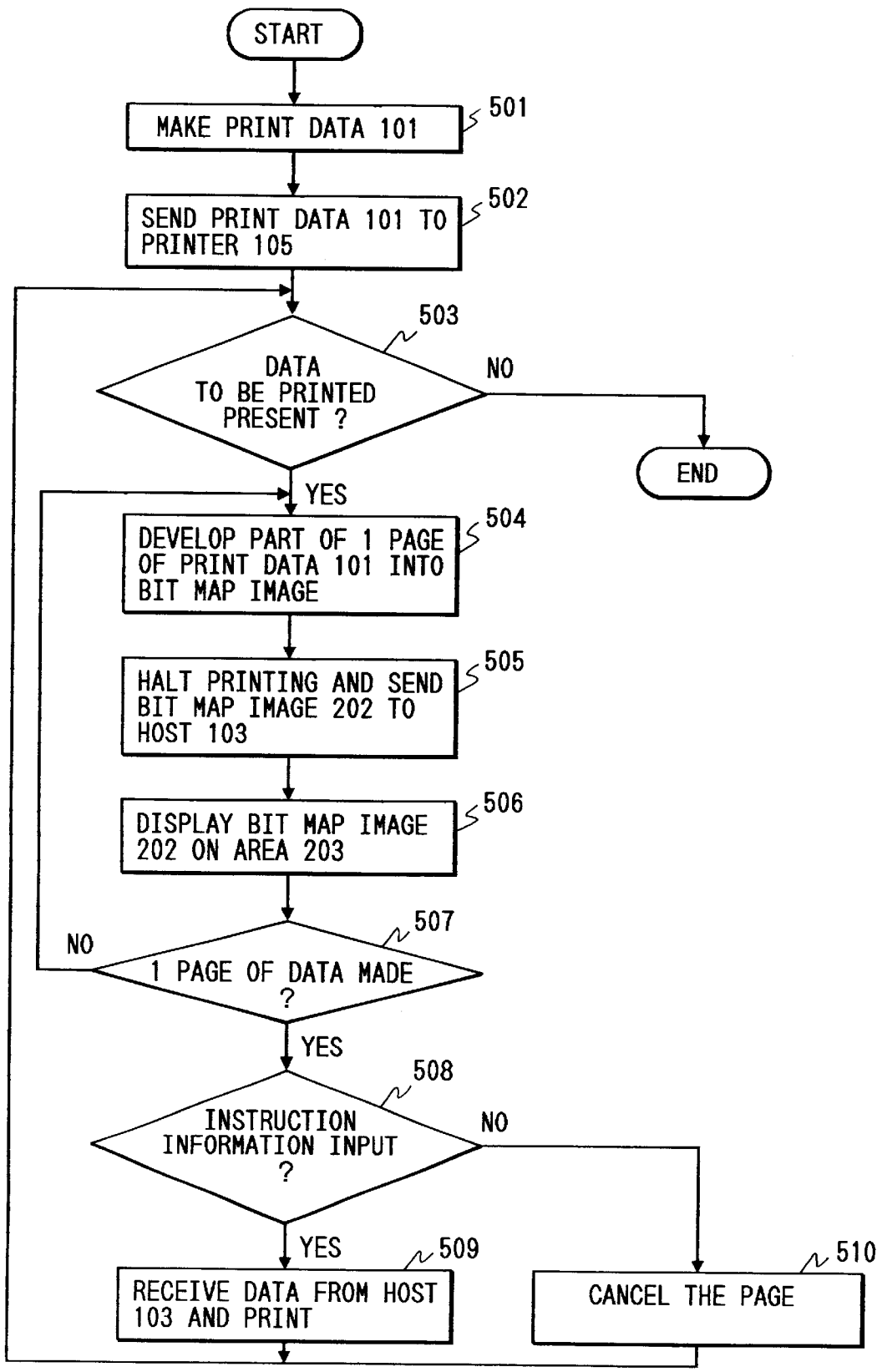

PRINTING APPARATUS AND PRINTING METHOD

This application is a continuation of application Ser. No. 08/281,176, filed Jul. 27, 1994, now abandoned.

BACKGROUND OF THE INVENTION

1. Field of the Invention

The present invention relates to a printing apparatus and, more particularly, to a printing apparatus for receiving data which is described by a printer language from a host computer and for printing an image such as characters, figures, or the like on the basis of the data.

2. Description of the Related Art

Hitherto, a printing apparatus generally individually has resources such as print fonts or the like which are actually used in the printing. The printing apparatus receives the data described by a printer language from a host computer and develops the data by using the above resources and prints it.

In case of printing data by using a printer as mentioned above, however, there is a problem such that the resource such as a font or the like which is used by the host computer in order to display data on a screen does not exist in the resources which are used in the printer or, even the case of a resource of the same name, the print result which the user expects cannot be obtained because of a reason such that the implement of the source slightly differs in dependence on the supplying side.

Namely, as shown in a conceptual diagram of FIG. 1, in the case where print data 101 described by the printer language is formed on a host computer 103 having a resource 102 and the formed print data 101 is printed by a printer 105 having a resource 104, when the font designated by the print data 101 does not exist in the printer 105, there is a case where a display result 106 on the screen of the host computer 103 does not coincide with a print result 107 of the printer 105. Reference numeral 108 denotes an interface cable to connect the host computer 103 and the printer 105. The interface cable 108, however, cannot bidirectionally transmit and receive information.

It is an object of the present invention to provide a printing apparatus and printing method, in which it is possible to prevent a print result different from that expected by the user from being obtained and an undesirable printing can be suppressed in consideration of the above problems.

According to the present invention, the above object is accomplished by a printing apparatus comprising: bit map image developing means for receiving print data from a host computer through a bidirectional interface and developing it into a bit map image; bit map image transmitting means for transmitting the bit map image developed by the bit map image developing means to the host computer through the bidirectional interface; input means for inputting instruction information to instruct a printing process through the bidirectional interface; and print control means for printing the bit map image on the basis of the instruction information received through the input means.

According to the present invention, in consideration of the problem such that there is a case where the result which is obtained on the screen of the host computer differs from the result from the printing apparatus, the printer transmits the bit map image developed from the print data to the host computer, the bit map image is displayed on the host computer, the user is allowed to judge whether the output result from the printer can be admitted as a result expected by the user or not, and only the output result which can be admitted is printed. Therefore, it is possible to prevent that the print result different from the result expected by the user is obtained, and the undesirable printing can be suppressed.

BRIEF DESCRIPTION OF THE DRAWINGS

FIG. 5 is a flowchart showing a processing procedure in the case where a bit map image of one page in the third embodiment of the present invention cannot be stored in a RAM of a printer.

DETAILED DESCRIPTION OF THE PREFERRED EMBODIMENTS

Embodiments of the present invention will be described in detail hereinbelow with reference to the drawings.

Figure 1:
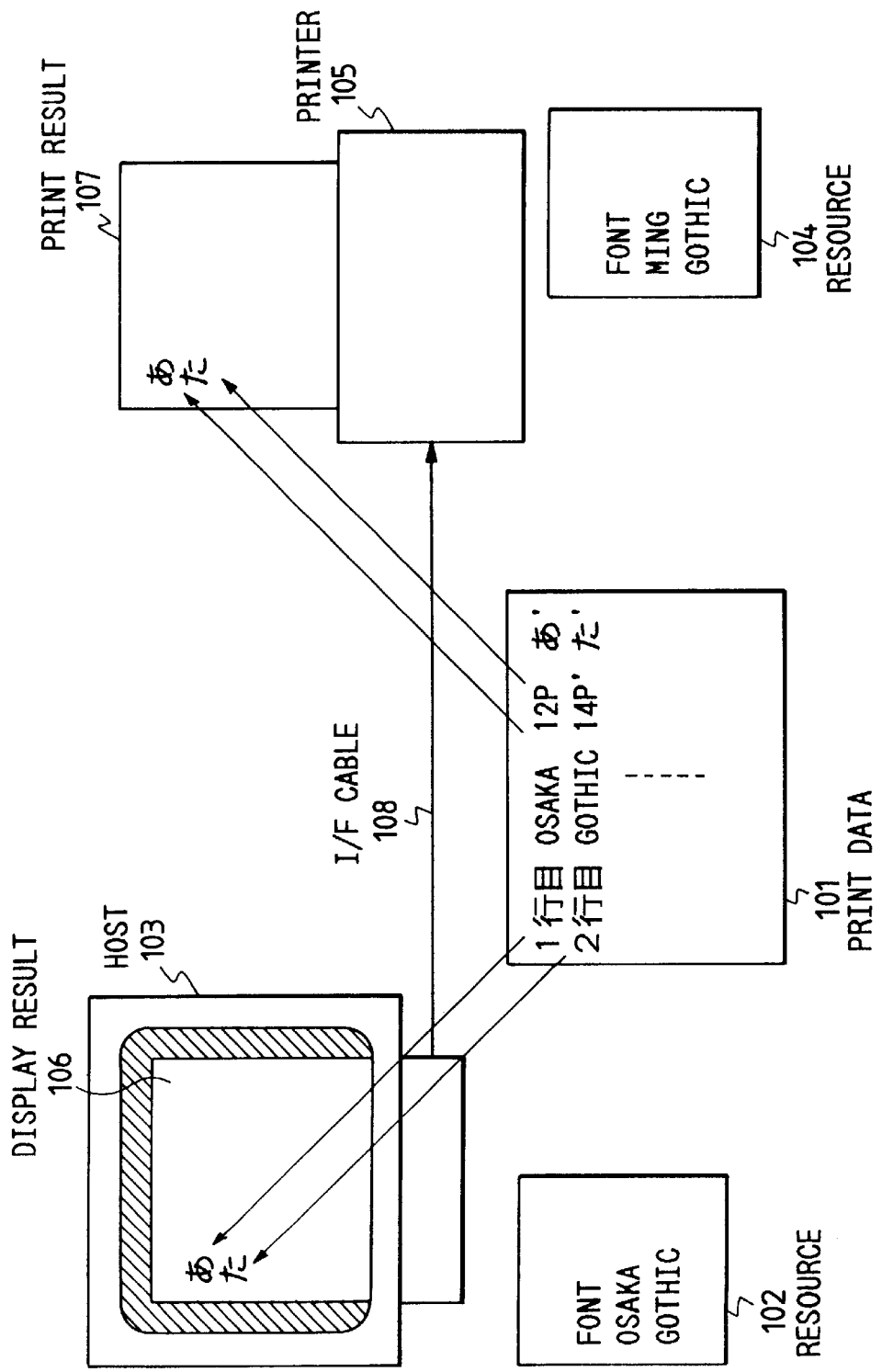
FIG. 1 is a conceptual diagram showing a conventional processing function which includes a case where an image on a host computer differs from an image that is derived from a printer.
Figure 2:
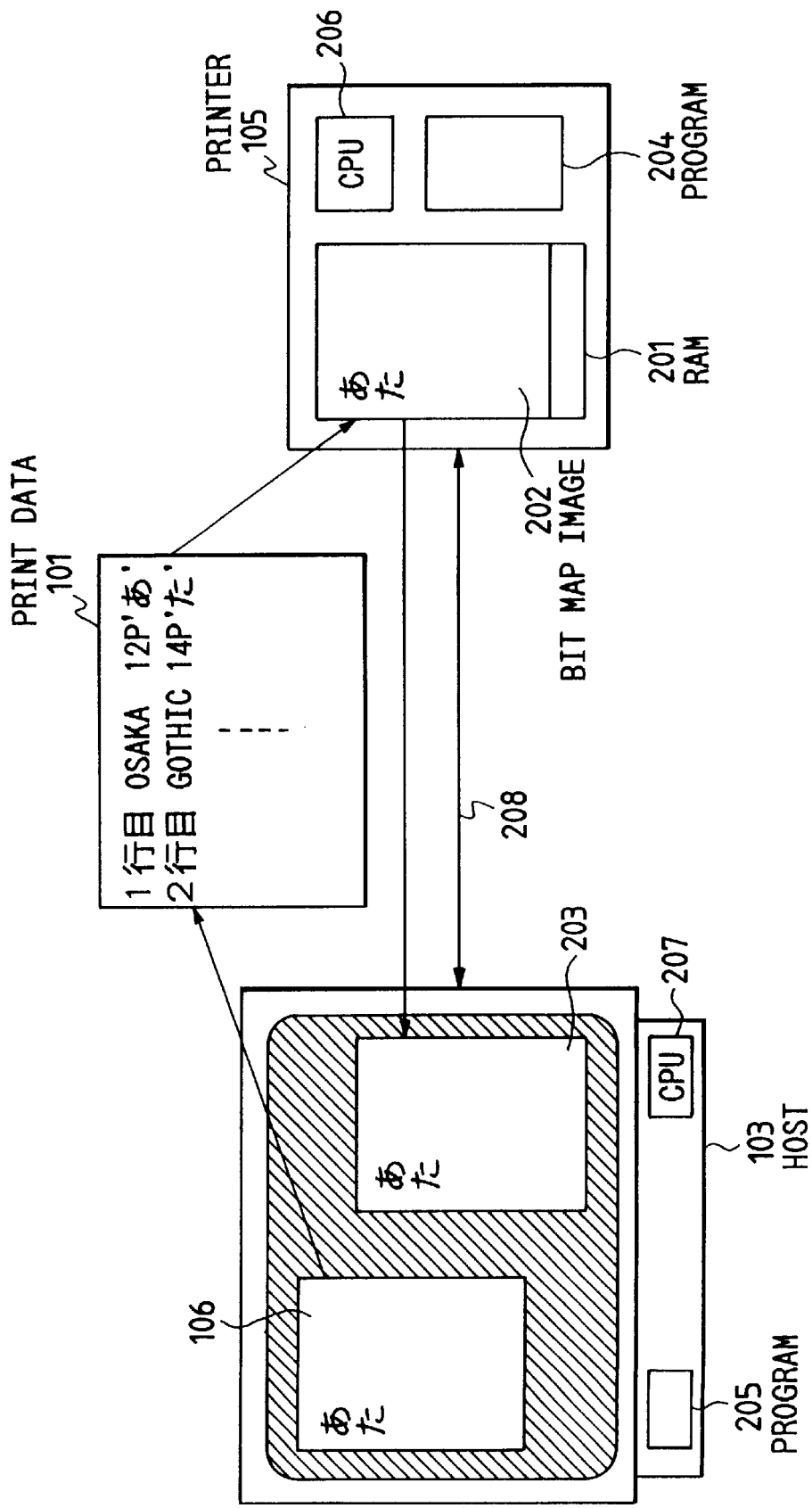
FIG. 2 is a conceptual diagram showing a function which is realized by the present invention.

FIG. 2 shows a schematic construction around a printer of an embodiment of the invention.

In FIG. 2, reference numeral 201 denotes a RAM installed in the printer 105 of the embodiment. A formed bit map image or the like is stored into the RAM 201. Reference numeral 202 denotes a bit map image developed on the RAM 201 on the basis of a character code or control code which was input from the host computer 103 denotes through a bidirectional interface 208; 203 a screen display of the bit map image 202 on the host computer; 204 denotes a program which is installed into the printer 105 and is executed by a CPU 206; and 205 denotes a program which is installed into the host computer 103 and is executed by a CPU 207.

Figure 3:
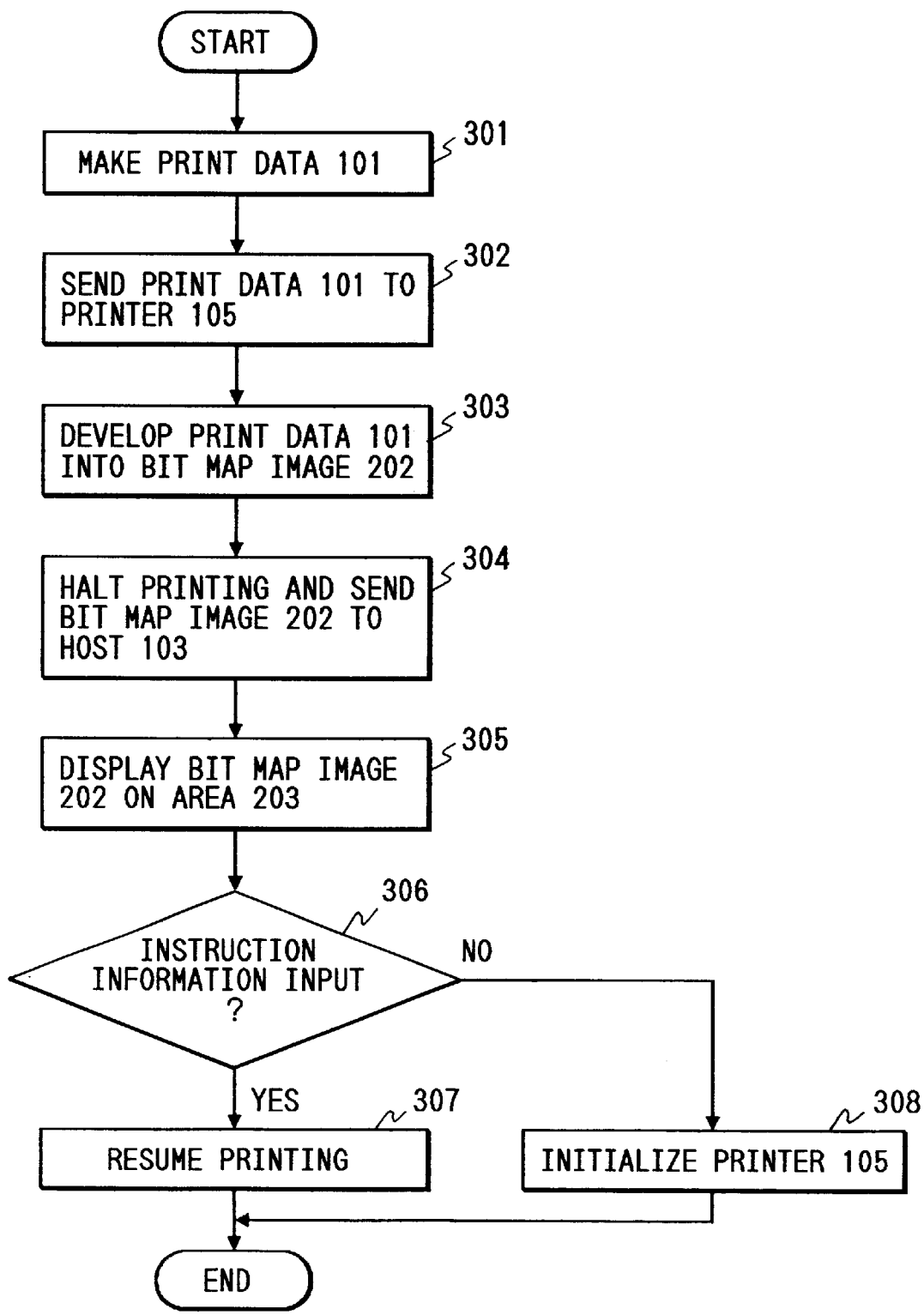
FIG. 3 is a flowchart showing a processing procedure in the case where a bit map image which is obtained by developing print data in the first embodiment of the present invention can be stored in a RAM of a printer.
Figure 4:
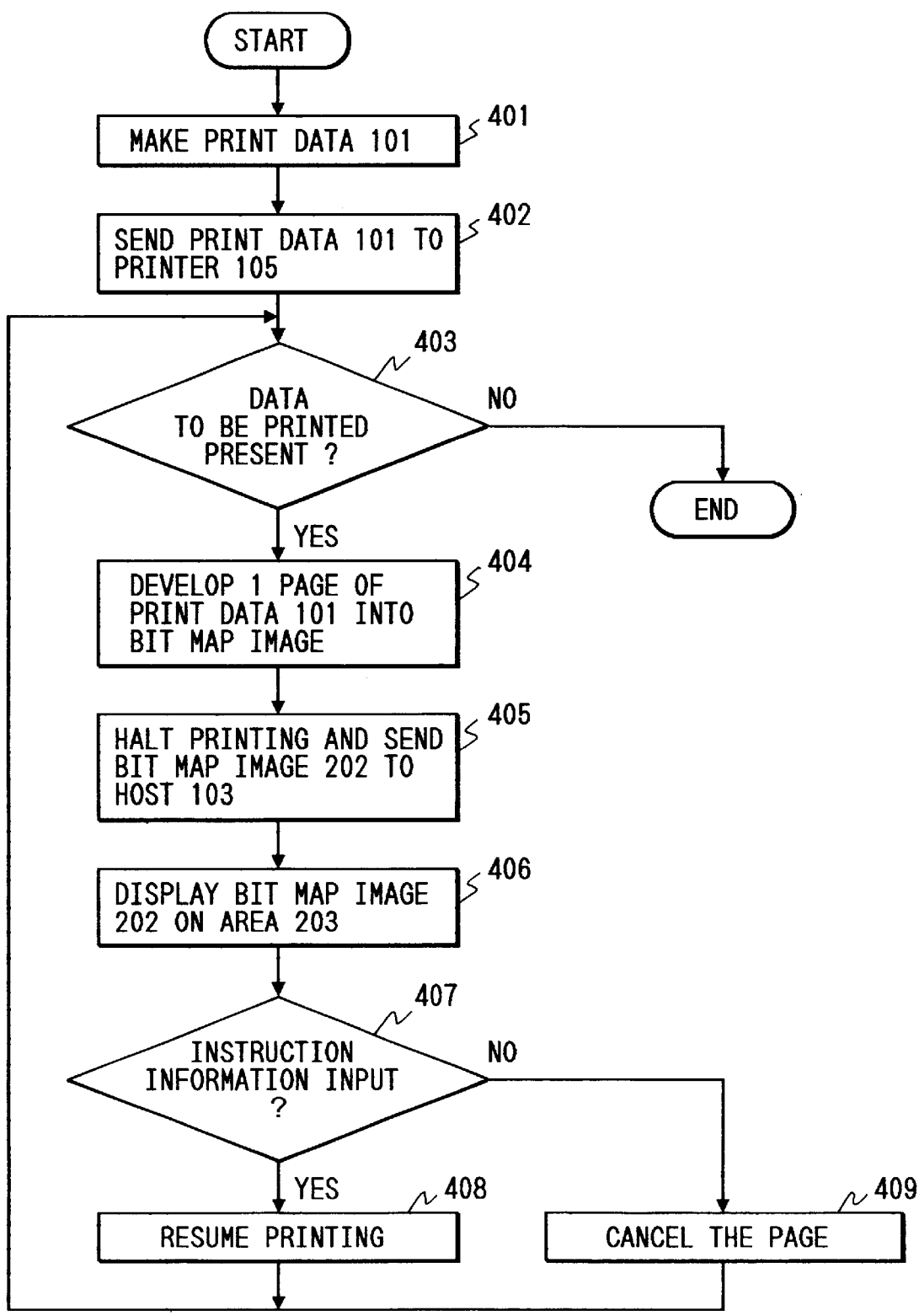
FIG. 4 is a flowchart showing a processing procedure in the case where a bit map image of one page in the second embodiment of the present invention can be stored in a RAM of a printer.

Programs shown in flowcharts of FIGS. 3, 4, and 5 are executed by the CPU 206 or 207.

FIG. 3 shows an operating procedure of the first embodiment of the invention. The operation of the embodiment of the invention will now be described with reference to FIGS. 2 and 3. First, on the basis of an instruction of the user, the CPU 207 executes an application program or the like in the host computer 103 and forms the print data 101 described by a printer language (step 301 in FIG. 3). By an instruction of the user, the CPU 207 transmits the formed print data 101 (for example, comprising a character code or control code or image data) to the printer 105 (step 302). The CPU 206 in the printer 105 develops the bit map image 202 from the received print data 101 onto the RAM 201 (step 303).

After the bit map image 202 is developed, the CPU 206 in the printer 105 halts the printing process of the printer 105 and transmits the bit map image 202 to the host computer 103 through the bidirectional interface 208 (step 304). The CPU 207 in the host computer 103 receives the bit map image 202 by the program 205 and displays the received bit map image 202 onto the screen 203 (step 305).

The CPU 207 in the host computer 103 discriminates whether the bit map image 202 displayed on the screen of the host computer 103 for the user should be printed or not, for instance, whether instruction information to instruct the continuation of the printing operation has been input or not (step 306). If YES, the continuation of the printing operation of the printer 105 is instructed to the CPU 206 of the printer 105 and the CPU 206 of the printer 105 continues the printing operation (step 307).

When it is judged in step S306 that the instruction information to instruct the continuation of the printing has not been inputted, the CPU 207 of the host computer 103 instructs the initialization of the printer 105 to the CPU 206 of the printer 105 through the bidirectional interface 208. The CPU 206 of the printer 105 initializes the printer 105 (step 308). The instruction information to instruct the continuation of the printing mentioned above is input by a method whereby the user selects a print continuation icon (not shown) on the display screen of the host computer 103 by using, for example, a keyboard or a pointing device (not shown).

[Another Embodiment 1]

An example in which the print data 101 is converted into the bit map image in a lump has been shown in the first embodiment of the invention. An embodiment (second embodiment) in the case where the RAM 201 for bit map image of one page or more has initially been installed in the printer 105 will now be described with reference to a flowchart of FIG. 4.

The CPU 207 in the host computer 103 forms print data described by the printer language by using an application program or the like (step 401 in FIG. 4). In response to an instruction of the user, the CPU 207 transmits the formed print data 101 to the printer 105 through the bidirectional interface 208 (step 402). The CPU 206 in the printer 105 checks to see if the print data to be printed exists in a reception buffer (RAM) (not shown) or not (step 403). If it doesn't exist, the processing routine is finished. If it exists, one page of the print data 101 received is developed into the bit map image on the RAM 201 (step 404).

The CPU 206 in the printer 105 halts the printing process of the printer 105 and transmits the bit map image 202 to the host computer 103 through the bidirectional interface 208 (step 405). The CPU 207 in the host computer 103 receives the bit map image 202 and displays the received bit map image 202 onto the display screen 203 (step 406).

The CPU 207 of the host computer 103 allows the user to confirm whether the bit map image 202 displayed on the screen of the host computer 103 should be printed or not by, for instance, discriminating whether the instruction information has been input or not (step 407). When it is confirmed that the printing is executed, the CPU 206 of the printer 105 instructs to resume the printing process of the printer 105 through the bidirectional interface 208 and the CPU 206 of the printer 105 instructs the printing of one page of data (step 408).

When it is confirmed that the printing is not executed, the CPU 207 of the host computer 103 instructs the cancellation of the bit map image 202 to the CPU 206 of the printer 105 through the bidirectional interface 208 and the CPU 206 cancels the bit map image 202 (step 409).

The printer 105 restarts the processes from the foregoing step 403.

The above processes are repeated until the received print data 101 is consumed.

[Another Embodiment 2]

An embodiment (third embodiment) in the case where only the RAM 201 for bit map image of an amount less than one page has been installed in the printer 105 will now be described in detail with reference to a flowchart of FIG. 5.

The CPU 207 in the host computer 103 forms the print data described by the printer language 101 by using the application program or the like (step 501 in FIG. 5). In response to an instruction of the user, the CPU 207 transmits the formed print data 101 to the printer 105 through the bidirectional interface 208 (step 502). The CPU 206 in the printer 105 checks to see if the print data 101 to be printed exists in the reception buffer (RAM) (not shown) or not (step 503). If the print data 101 doesn't exist, the processing routine is finished. If it exists, a part of one page of the print data 101 received is developed into the bit map image on the RAM 201 (step 504).

The CPU 206 in the printer 105 halts the printing process of the printer 105 and transmits the bit map image 202 to the host computer 103 through the bidirectional interface 208 (step 505). The CPU 207 in the host computer 103 receives the bit map image 202 and displays the received bit map image 202 onto the screen 203 (step 506).

The CPU 206 in the printer 105 discriminates whether the bit map image of one page has been transmitted to the host computer 103 or not (step 507). When an amount of transmitted bit map is less than one page, the processes from step 504 are repeated until the bit map image of one page has been transmitted.

When the data of one page is transmitted to the host computer 103 and the bit map image of one page is displayed on the screen of the host computer 103, the CPU 207 in the host computer 103 allows the user to judge whether the bit map image 202 displayed on the screen of the host computer 103 should be printed or not by, for example, checking whether the instruction information has been input or not (step 508). When it is confirmed that the printing is executed, the data of the relevant page of the print data 101 from the host computer 103 or the bit map image displayed on the screen of the host computer 103 is transmitted to the CPU 206 of the printer 105 through the bidirectional interface 208 and the CPU 206 instruct the printing of one page (step 509).

When it is confirmed that the printing is not performed, the CPU 206 of the printer 105 cancels the bit map image 202 (step 510).

The processes are again started from step 503 mentioned above.

The above processes are repeated until the received print data 101 is consumed.

In the description of each of the above embodiments, it is assumed that the memory location to develop the print data 101 is the RAM. However, a similar effect can be also obviously obtained even by using a secondary memory such as hard disc drive (HDD).

According to the invention as described above, before the print result itself which is obtained from the printer is printed, a confirmation by the user is performed on the host computer and, after that, the print image is printed. Therefore, it is possible to prevent that the print result different from that expected by the user is obtained. Undesirable printing can thus be avoided.

What is claimed is:

1. A printing apparatus comprising:
   conversion means for receiving print data from an information processing apparatus through a bidirectional interface and for converting the received print data part by part into a bit map image, each part being less than one page;
   memory means for storing the bit map image converted by said conversion means;
   transmission means for transmitting one page of image based on the bit map image converted part by part by said conversion means to the information processing apparatus through the bidirectional interface so as to allow an operator of the information processing apparatus to determine whether the bit map image stored in said memory means is to be printed; and print control means for controlling the printing or cancelling of the bit map image stored in said memory means in response to reception of instruction information provided by the information processing apparatus based on the one page of image transmitted by said transmission means to the information processing apparatus.

2. An apparatus according to claim 1, wherein said transmission means transmits the bit map image of one page to the information processing apparatus.

3. An apparatus according to claim 1, wherein the information processing apparatus displays the bit map image transmitted by said transmission means onto a display means.

4. An apparatus according to claim 1, wherein said print control means deletes the bit map image if the received instruction information indicates that the bit map image is not to be printed.

5. A printing method comprising the steps of:

receiving print data from an information processing apparatus through a bidirectional interface and converting the received print data part by part into a bit map image, each part being less than one page;

storing the converted bit map image;

transmitting one page of image based on the part by part converted bit map image to the information processing apparatus through the bidirectional interface so as to allow an operator of the information processing apparatus to determine whether the bit map image stored in said storing step is to be printed; and controlling the printing or cancelling of the stored bit map image in response to reception of instruction information provided by the information processing apparatus based on the one page of image transmitted to the information processing apparatus in said transmitting step.

6. A method according to claim 5, wherein the information processing apparatus displays the transmitted bit map image onto a display.

7. A method according to claim 5, wherein said controlling step deletes the bit map image if the received instruction information indicates that the bit map image is not to be printed.

8. A printing apparatus comprising:

a converter for converting part by part print data received from an information processing apparatus through a bidirectional interface into a bit map image, each part being less than one page;

a memory for storing the bit map image converted by said converter;

a transmitter for transmitting one page of image based on the bit map image converted part by part by said converter to the information processing apparatus through the bidirectional interface so as to allow an operator of the information processing apparatus to determine whether the bit map image stored in said memory is to be printed;

a controller for controlling the printing or cancelling of the bit map image stored in said memory in response to reception of instruction information provided by the information processing apparatus based on the one page of image transmitted by said transmitter to the information processing apparatus.

9. An apparatus according to claim 8, wherein the information processing apparatus displays the bit map image transmitted by said transmitter onto a display.

10. An apparatus according to claim 8, wherein said controller deletes the bit map image if the received instruction information indicates that the bit map image is not to be printed.

11. A storage medium used in a printing apparatus, said storage medium comprising storage means for storing a program comprising processes for:

converting part by part print data received from an information processing apparatus through a bidirectional interface into a bit map image, each part being less than one page;

storing the converted bit map image;

transmitting one page of image based on the part by part converted bit map image to the information processing apparatus through the bidirectional interface so as to allow an operator of the information processing apparatus to determine whether the bit map image stored in said storing process is to be output; and controlling the outputting or cancelling of the stored bit map image to a printer engine in response to reception of instruction information provided by the information processing apparatus based on the one page of image transmitted to the information processing apparatus in said transmitting process.

12. A storage medium according to claim 11, wherein the information processing apparatus displays the transmitted bit map image onto a display.

13. A storage medium according to claim 11, wherein, in said controlling process, the bit map image is deleted when the received instruction information indicates that the bit map image is not to be printed.

14. An information processing apparatus comprising:

transmission means for transmitting print data to a printer through a bidirectional interface;

display control means for receiving from the printer one page of image generated based on bit image data converted part by part by the printer from the print data transmitted by said transmission means, each part being less than one page, and for controlling display means to display the received image;

instruction input means for inputting, after display of the received image by the display means, print instruction information to cause the printer to execute a printing process of the transmitted print data; and instruction output means for outputting an instruction to the printer through the bidirectional interface to execute the printing process in response to said instruction input means inputting the print instruction information.

15. An apparatus according to claim 14, further comprising generation means for generating the print data described in a printer language.

16. An apparatus according to claim 14, wherein said instruction output means gives an instruction to the printer through the bidirectional interface to initialize the printer in an absence of the print instruction information.

17. An apparatus according to claim 14, wherein said instruction output means gives the instruction to the printer to print data based on the bit image data converted by the printer and stored therein.

18. A printing system comprising:

an information processing apparatus comprising:

i) first transmission means for transmitting print data to a printing apparatus through a bidirectional interface;

ii) display control means for receiving from the printing apparatus one page of image generated based on bit image data converted part by part by the printing apparatus from the print data transmitted by said first transmission means, each part being less than one page, and for controlling a display means to display the received image; and iii) instruction means for giving an instruction to the printing apparatus through the bidirectional interface to execute a printing operation in response to input of print instruction information; and the printing apparatus comprising:

i) conversion means for receiving the print data transmitted by said first transmission means through the bidirectional interface and for converting the received print data part by part into the bit image data, each part being less than one page;

ii) memory means for storing the bit image data converted by said conversion means;

iii) second transmission means for transmitting one page of image based on the bit image data converted part by part by said conversion means to said information processing apparatus through the bidirectional interface; and iv) print control means for controlling a printing means to execute the printing operation in response to said instruction means giving the instruction after transmission of the one page of image by said second transmission means.

19. A system according to claim 18, further comprising generation means for generating the print data described in a printer language.

20. A system according to claim 18, wherein said instruction means gives an instruction to said printing apparatus through the bidirectional interface to initialize said printing apparatus in an absence of the print instruction information.

21. A system according to claim 18, wherein said instruction means gives the instruction to said printing apparatus to print data based on the bit image data stored in said memory means.

22. An information processing method, comprising the steps of:

transmitting print data to a printer through a bidirectional interface;

receiving from the printer one page of image generated based on bit image data converted part by part by the printer from the print data transmitted in said transmitting step, each part being less than one page, and controlling a display to display the received image;

inputting, after display of the received image in said receiving step, print instruction information to cause the printer to execute a printing process of the transmitted print data; and outputting an instruction to the printer through the bidirectional interface to execute the printing process in response to said step of inputting the print instruction information.

23. A method according to claim 22, further comprising the step of generating the print data described in a printer language.

24. A method according to claim 22, wherein in said outputting step, an instruction is given to the printer through the bidirectional interface to initialize the printer in an absence of the print instruction information.

25. A method according to claim 22, wherein in said outputting step, the instruction is given to the printer to print data based on the bit image data converted by the printer and stored therein.

26. A printing method, comprising the steps of:

processing information in an information processing apparatus, including the steps of:

i) transmitting print data to a printing apparatus through a bidirectional interface;

ii) receiving from the printing apparatus one page of image generated based on bit image data converted part by part by the printing apparatus from the print data transmitted in said print data transmitting step, each part being less than one page;

iii) controlling a display to display an image received in said receiving step; and iv) instructing the printing apparatus through the bidirectional interface to execute a printing operation in response to an input of print instruction information; and printing information with the printing apparatus, comprising the steps of:

i) receiving the print data transmitted in said print data transmitting step through the bidirectional interface;

ii) converting, part by part, the print data received in said receiving the print data step into the bit image data, each part being less than one page;

iii) storing the bit image data converted in said converting step;

iv) transmitting one page of image based on the bit image data converted part by part in said converting step to the information processing apparatus through the bidirectional interface; and v) controlling the printing apparatus to execute the printing operation in response to the instruction given in said instructing step, after transmission of the one page of image in said image transmitting step.

27. A method according to claim 26, further comprising the step of generating the print data described in a printer language.

28. A method according to claim 26, wherein in said instructing step an instruction is given to the printing apparatus through the bidirectional interface to initialize the printing apparatus in an absence of the print instruction information.

29. A method according to claim 26, wherein in said instructing step the instruction is given to the printing apparatus to print data based on the bit image data stored in said storing step.

30. A computer readable medium having computer readable program code means embodied therein, the program code means controlling the steps of:

transmitting print data to a printer through a bidirectional interface;

receiving from the printer one page of image generated based on bit image data converted part by part by the printer from the print data transmitted in said transmitting step, each part being less than one page, and controlling a display to display the received image;

inputting, after display of the received image in said receiving step, print instruction information to cause the printer to execute a printing process of the transmitted print data; and outputting an instruction to the printer through the bidirectional interface to execute the printing process in response to said step of inputting the print instruction information.

31. A computer readable medium according to claim 30, said program code means further controlling the step of generating the print data described in a printer language.

32. A computer readable medium according to claim 30, wherein in said outputting step, an instruction is given to the printer through the bidirectional interface to initialize the printer in an absence of the print instruction information.

33. A computer readable medium according to claim 30, wherein in said outputting step, the instruction is given to the printer to print data based on the bit image data converted by the printer and stored therein.

34. A computer readable medium having computer readable program code means embodied therein, the program code means controlling the steps of:

processing information in an information processing apparatus, including the steps of:
i) transmitting print data to a printing apparatus through a bidirectional interface;
ii) receiving from the printing apparatus one page of image generated based on bit image data converted part by part by the printing apparatus from the print data transmitted in said print data transmitting step, each part being less than one page;
iii) controlling a display to display an image received in said receiving step; and
iv) instructing the printing apparatus through the bidirectional interface to execute a printing operation in response to an input of print instruction information; and printing information with the printing apparatus, comprising the steps of:
i) receiving the print data transmitted in said print data transmitting step through the bidirectional interface;
ii) converting, part by part, the print data received in said receiving the print data step into the bit image data, each part being less than one page;
iii) storing the bit image data converted in said converting step;
iv) transmitting one page of image based on the bit image data converted part by part in said converting step to the information processing apparatus through the bidirectional interface; and
v) controlling the printing apparatus to execute the printing operation in response to the instruction given in said instructing step, after transmission of the one page of image in said image transmitting step.

35. A computer readable medium according to claim 34, said program code means further controlling the step of generating the print data described in a printer language.

36. A computer readable medium according to claim 34, wherein in said instructing step an instruction is given to the printing apparatus through the bidirectional interface to initialize the printing apparatus in an absence of the print instruction information.

37. A computer readable medium according to claim 34, wherein in said instructing step the instruction is given to the printing apparatus to print data based on the bit image data stored in said storing step.

38. An apparatus according to claim 1, further comprising means for determining whether the image transmitted by said transmission means to the information processing apparatus has an amount equal to or less than one page,
wherein if said determining means determines that the transmitted image has an amount less than one page, said conversion means sequentially converts the received print data part by part into the bit map image, each part being less than one page, and said transmission means sequentially transmits the bit map image part by part.

39. An apparatus according to claim 1, further comprising reception means for receiving from the information processing apparatus the bit map image transmitted by a transmission means of the information processing apparatus,
wherein said print control means controls the printing or cancelling of the bit map image received by said reception means.

40. A method according to claim 5, further comprising the step of determining whether the image transmitted in said transmission step to the information processing apparatus has an amount equal to or less than one page,
wherein if it is determined in said determining step that the transmitted image has an amount less than one page, the received print data is sequentially converted, part by part, into the bit map image in said receiving step, each part being less than one page, and in said transmission step, the converted bit map image is sequentially transmitted part by part.

41. A method according to claim 5, further comprising the step of receiving from the information processing apparatus the bit map image transmitted in said transmission step to the information processing apparatus,
wherein the printing or cancelling of the bit map image received from the information processing apparatus is controlled in said controlling step.

* * * * *

UNITED STATES PATENT AND TRADEMARK OFFICE
CERTIFICATE OF CORRECTION

PATENT NO. : 6,288,789 B1
DATED : September 11, 2001
INVENTOR(S) : Takuto Harada It is certified that error appears in the above-identified patent and that said Letters Patent is hereby corrected as shown below:

Column 2,
Line 40, "203" should read -- 203 denotes --.

Column 4,
Line 48, "be also" should read -- also be --.

Column 5,
Line 62, "printed;" should read -- printed; and --.

Column 7,
Line 64, "wherein" should read -- wherein, --.

Column 8,
Lines 1, 42 and 47, "wherein" should read -- wherein, --.

Column 9,
Lines 5 and 9, "wherein" should read -- wherein, --.

Column 10,
Lines 2 and 7, "wherein" should read -- wherein, --.

Signed and Sealed this

Thirtieth Day of April, 2002

*Attest:*

*Attesting Officer*

JAMES E. ROGAN
*Director of the United States Patent and Trademark Office*